UNITED STATES PATENT OFFICE.

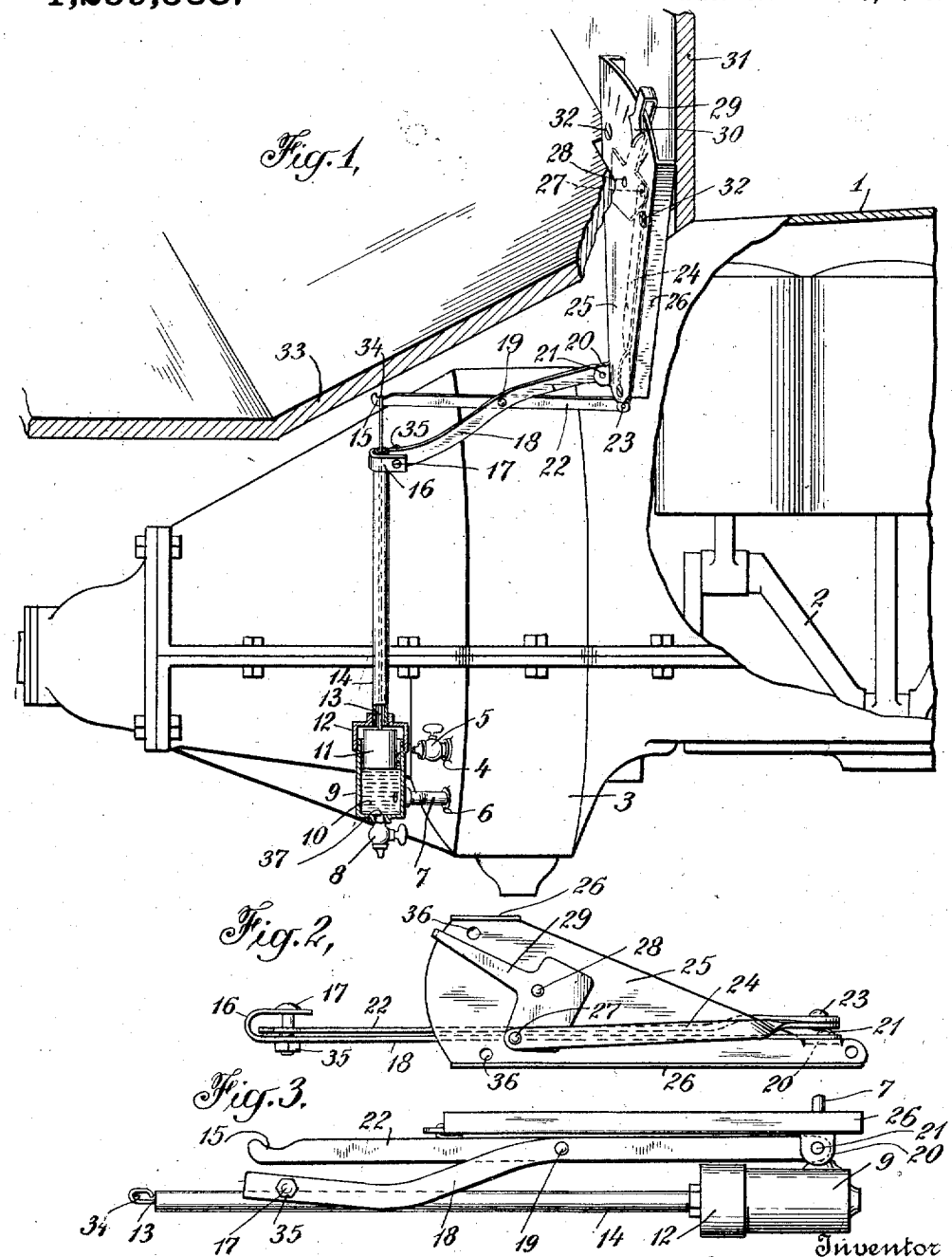

THOMAS C. LUCE, OF STRATFORD, CONNECTICUT.

FOLDING AUTOMOBILE OIL-GAGE.

1,259,538.  Specification of Letters Patent.  Patented Mar. 19, 1918.

Application filed March 14, 1917. Serial No. 154,798.

*To all whom it may concern:*

Be it known that I, THOMAS C. LUCE, a citizen of the United States, residing at Stratford, Fairfield county, State of Connecticut, have made a certain new and useful Invention Relating to Folding Automobile Oil-Gages, of which the following is a specification, taken in connection with the accompanying drawing, which forms part of the same.

This invention relates especially to automobile oil gages which are adapted to be readily attached to Ford or similar automobiles, parts of the detachable gage being pivoted together so as to readily fold and facilitate the compact packaging and shipping of the device.

In the accompanying drawing showing in a somewhat diagrammatic way an illustrative embodiment of this invention, Figure 1 is a side elevation, parts being shown in section illustrating the application of the gage device to a Ford automobile.

Fig. 2 shows part of the gage in its folded shipping position; and

Fig. 3 is another view showing the entire folded gage device.

As indicated in Fig. 1 the gage device before complete assembly may comprise a tubular float or gage chamber 9 constructed, if desired, with a screw connected cap or top 12 to which the tube 14 is screwed or otherwise secured in any suitable way. This oil chamber may be conveniently connected to the motor casing 3 by unscrewing from its test hole 6 the lower oil cock which is of course similar to the upper cock 5 secured in its test hole 4. Then the tubular stem 7 which may be permanently attached to the gage chamber may be screwed into this test hole 6, the cap and tube being under these conditions preferably removed from the oil chamber which is thus readily secured in position in the motor casing and rigidly held in relation thereto so as to properly support the other parts of the device. If desired, the oil cock 8 which has been removed from the motor casing may be screwed into a suitably threaded aperture, such as 37, which may be located in any suitable part of the gage chamber so that this oil cock is rendered available for drainage or test purposes.

When the gage chamber has thus been mounted on the casing the cap 12 and attached tube 14 are screwed thereto so that when the normal amount of lubricating oil is present in the motor casing to lubricate the crank shaft 2 and other parts of the engine 1 the oil rises to a corresponding height in the gage chamber and correspondingly raises a suitable float, such as 11, which may be mounted on a float rod 13 extending within the tube 14, the upper end of this float rod being preferably formed into a loop 34 as indicated in Figs. 1 and 3, to more readily coöperate with and actuate the moving parts of the indicating device.

The gage device preferably comprises a dial plate such as 25, which may be conveniently formed of sheet metal and provided with lateral spacing ribs 26 so as to space the body of the plate away from the front board 31 to which it may be conveniently attached by one or more screws or bolts 32. In this way the dial plate is readily mounted in position on the machine extending, if desired, through a suitable slot formed in the footboard 33 and a perpendicularly upstanding bearing lug 20 is preferably formed adjacent the lower end of this dial plate to support a fulcrum or connection bracket 17 which may be pivoted to this lug as by the folding pin 21. The rear end of this fulcrum bracket may be formed with a loop or clamp 16 adapted to embrace the upper end of the tube 14 and be securely clamped thereto as by the bolt 17 and nut 35 shown more in detail in Figs. 2 and 3. In this way the lower end of the dial plate 25 and the upper end of the tube 14 are readily and securely connected so as to be definitely spaced apart under all conditions and the fulcrum bracket connecting these parts also serves to support the pivoted balance lever 22 which may be loosely pivoted adjacent its central portion about the fulcrum pin 19 in the fulcrum bracket. As indicated a suitable depression or alining socket 15 may be formed in the rear end of this balance lever to coöperate with the loop 34 on the float rod which is thus automatically held in alinement because tending to remain at the lower portion of this socket and this lever thus transmits the indications of the float in the chamber below to suitable indicator connections which as shown may comprise the balance link 24 of sheet metal or other material having its lower portion substantially parallel to the bearing lug 20 and connected to the balance lever by a pivot 23. The upper end of this balance link may be pivoted by the pin 27 to an indicator lever 29 preferably of the rock lever type which may be pivoted by the pin 28 on the concealed side of the dial plate next the front board having an upstanding indicating portion 29 of any suitable construction, the recurved end 30 of which extending, if desired, over the circular top portion of the dial plate so as to coöperate with a suitable scale formed thereon in any desired way.

The oil level in the motor casing is thus visibly indicated to the operator at all times under running conditions so that it is easy to maintain the most efficient amount of lubricating oil in the engine. Furthermore the construction of the gage is such that the weight of the balance link 24 connected to the balance lever 22 acts to partly counterbalance the weight of the float and float rod depending from the other end of this lever so that more accurate indications are insured. At the same time the device is so constructed as to readily fold into most compact shipping condition when the clamp is removed from the tube. The fulcrum bracket under these conditions folds up about its pin 21 substantially against the dial plate 25 and at the same time the balance lever turns about its pivot 23 into a generally similar position as indicated in Figs. 2 and 3, the connected end of the balance link projecting somewhat if desired beyond the cut-away lower portion of the dial plate and the link and connected indicator lever automatically moving into such position that the pins 21 and 23 are substantially co-axial which promotes this folding without distortion or strain of the parts. As indicated this part of the device can then be packed up together with the gage chamber and other connected elements which are of about the same combined length and the entire device can be readily shipped and also assembled and mounted on an automobile by practically any one.

This invention has been described in connection with a number of illustrative embodiments, forms, proportions, parts, materials and arrangements, to the details of which disclosure the invention is not of course to be limited, since what is claimed as new and what is desired to be secured by Letters Patent is set forth in the appended claims.

1. The folding oil gage device adapted to be attached to a Ford or similar automobile comprising a gage chamber and connected tubular stem adapted to be screwed into an aperture in the motor casing, a tube and connected cap adapted to be screwed to said gage chamber, a float within said gage chamber and a connected float rod projecting through said tube and having an upper looped end, a dial plate having lateral spacing ribs and adapted to be secured to the automobile front board and provided with a bearing lug projecting from the face of the plate, a fulcrum bracket pivotally connected to said bearing lug and having a clamp at its free end adapted to be removably secured to the upper end of said tube, a balance lever pivotally mounted adjacent its middle portion on said fulcrum bracket and disengageably coöperating with said float rod, an indicator lever mounted on said dial plate and having a visible indicator coöperating therewith and a balance link connected to said indicator lever and having its other end substantially parallel to said bearing lug and pivoted to said balance lever to enable said balance lever and fulcrum bracket when disconnected from said tube and rod to be folded adjacent said dial plate for shipping purposes.

2. The folding oil gage device adapted to be attached to a Ford or similar automobile comprising a gage chamber and connected tubular stem adapted to be screwed into an aperture in the motor casing, a tube and connected cap adapted to be screwed to said gage chamber, a float within said gage chamber and a connected float rod projecting through said tube, a dial plate adapted to be secured to the automobile and provided with a bearing lug, a fulcrum bracket pivotally connected to said bearing lug and having a clamp at its free end adapted to be removably secured to the upper end of said tube, a balance lever pivotally mounted adjacent its middle portion on said fulcrum bracket and disengageably coöperating with said float rod, an indicator lever mounted on said dial plate and having a visible indicator coöperating therewith and a balance link connected to said indicator lever and having its other end substantially parallel to said bearing lug and pivoted to said balance lever to enable said balance lever and fulcrum bracket when disconnected from said tube and rod to be folded adjacent said dial plate for shipping purposes.

3. The folding oil gage device adapted to be attached to a Ford or other automobile comprising a gage chamber and connected tubular supporting stem adapted to be connected to an aperture in the motor casing, a tube and connected cap detachably connected to said gage chamber, a float within said gage chamber and a connected float rod projecting through said tube and having an upper looped end, a dial plate having lateral spacing ribs and adapted to be secured to the automobile front board and provided with a perpendicularly upstanding bearing member, a fulcrum bracket pivotally connected to said bearing member and having a securing member at its free end adapted to be removably secured to the upper end of said tube, a balance lever pivotally mounted adjacent its middle portion on said fulcrum bracket and disengageably coöperating with said float rod device, an indicator mounted on said dial plate and having a visible indicator coöperating therewith and comprising a link connected to said indicator device and having its other end substantially parallel to said bearing member and permanently pivoted to said balance lever to enable said balance lever and fulcrum bracket when disconnected from said tube and rod to be folded adjacent said dial plate for shipping purposes.

4. The folding oil gage device adapted to be attached to a Ford or other automobile comprising a gage chamber and connected tubular supporting stem adapted to be connected to an aperture in the motor casing, a tube and connected cap detachably connected to said gage chamber, a float within said gage chamber and a connected float rod projecting through said tube, a dial plate adapted to be secured to the automobile and provided with a bearing member, a fulcrum bracket pivotally connected to said bearing member and having a securing member at its free end adapted to be removably secured to the upper end of said tube, a balance lever pivotally mounted adjacent its middle portion on said fulcrum bracket and disengageably coöperating with said float rod device, an indicator device mounted on said dial plate and having a visible indicator coöperating therewith and comprising a link connected to said indicator device and having its other end substantially parallel to said bearing member and permanently pivoted to said balance lever to enable said balance lever and fulcrum bracket when disconnected from said tube and rod to be folded adjacent said dial plate for shipping purposes.

5. The folding oil gage device adapted to be attached to a Ford or other automobile comprising a gage chamber and connected tubular stem adapted to be connected to an aperture in the motor casing, a tube and connected cap detachably connected to said gage chamber, a float within said gage chamber and a connected float rod projecting through said tube, a dial plate adapted to be secured to the automobile and provided with a bearing member, a fulcrum bracket pivotally connected to said bearing member and having a securing member at its free end adapted to be removably secured to the upper end of said tube, a balance lever pivotally mounted adjacent its middle portion on said fulcrum bracket and disengageably coöperating with said float rod, an indicator device mounted on said dial plate and having a visible indicator coöperating therewith and pivoted to said balance lever to enable said balance lever and fulcrum bracket when disconnected from said tube and rod to be folded adjacent said dial plate for shipping purposes.

6. The folding oil gage device comprising a gage chamber and connected tubular stem adapted to be connected to an aperture in a motor casing, a tube and connected cap detachably connected to said gage chamber, a float within said gage chamber and a connected float rod projecting through said tube, a dial plate provided with a bearing member, a fulcrum bracket pivotally connected to said bearing member and having a securing member at its free end adapted to be removably secured to the upper end of said tube, a lever pivotally mounted on said fulcrum bracket, and disengageably coöperating with said float rod, an indicator device mounted on said dial plate and having a visible indicator coöperating therewith and pivoted to said balance lever to enable said balance lever and fulcrum bracket when disconnected from said tube and rod to be folded adjacent said dial plate for shipping purposes.

THOMAS C. LUCE.

Witnesses:
Wm. C. Ettershank,
William B. Siegler.